AMPLITUDE MODULATION

Filed March 8, 1949 7 Sheets-Sheet 1

INVENTOR
Leslie L. Koros
BY Harry Tunick
ATTORNEY

AMPLITUDE MODULATION

Filed March 8, 1949

INVENTOR
Leslie L. Koros
BY Harry Tunick
ATTORNEY

INVENTOR
Leslie L. Koros
BY Harry Tunick
ATTORNEY

INVENTOR
Leslie L. Koros
BY Harry Tunick
ATTORNEY

FREQUENCY RESPONSE OF THE VIDEO AMPLIFIER TO PRODUCE CONSTANT PEAK POWER OUTPUT WITH CONSTANT VIDEO INPUT.

INVENTOR
Leslie L. Koros
BY Harry Tunick
ATTORNEY

INVENTOR
Leslie L. Koros
BY Harry Tunick
ATTORNEY

INVENTOR
Leslie L. Koros
BY Harry Tunick
ATTORNEY

Patented July 22, 1952

2,604,533

UNITED STATES PATENT OFFICE 2,604,533

AMPLITUDE MODULATION

Leslie L. Koros, Camden, N. J., assignor to Radio Corporation of America, a corporation of Delaware Application March 8, 1949, Serial No. 80,241

32 Claims. (Cl. 178—5.8)

This invention relates to amplitude modulation, and more particularly to amplitude modulation of transmitters.

An object of this invention is to provide a new system for amplitude modulation of radio frequency carriers. The system can be used at any frequency, but offers special advantages at ultra-high and microwave frequencies.

No system to date has been generally accepted as a good technical means for amplitude modulating ultra-high-frequency oscillators. The frequency-modulated magnetrons open the possibility of building frequency-modulated transmitters for ultra-high frequency, but frequency-modulated transmitters cannot take over the whole ultra-high-frequency communications field. Frequency-modulated ultra-high-frequency transmission can be used successfully in point-to-point communication with directional transmitting and receiving antennas, but in omnidirectional or semidirectional frequency-modulated systems heavy distortion has been observed, caused by multipath transmission. Investigations to date show that amplitude-modulated transmission has given acceptable results in cases where frequency-modulated transmission produces serious distortion. Amplitude-modulated transmission is therefore highly desirable in the ultra-high frequency field. Amplitude-modulated transmission provides advantages also in point-to-point systems because it reduces the bandwidth required for communication.

The foregoing and other objects of the invention will be best understood from the following description of some exemplifications thereof, reference being had to the accompanying drawings, wherein:

Fig. 1 is a block diagram of one form of transmitting system according to this invention;

Figs. 2*a*–2*e* represent the sideband frequency distribution in the system of Fig. 1;

Figure 5:
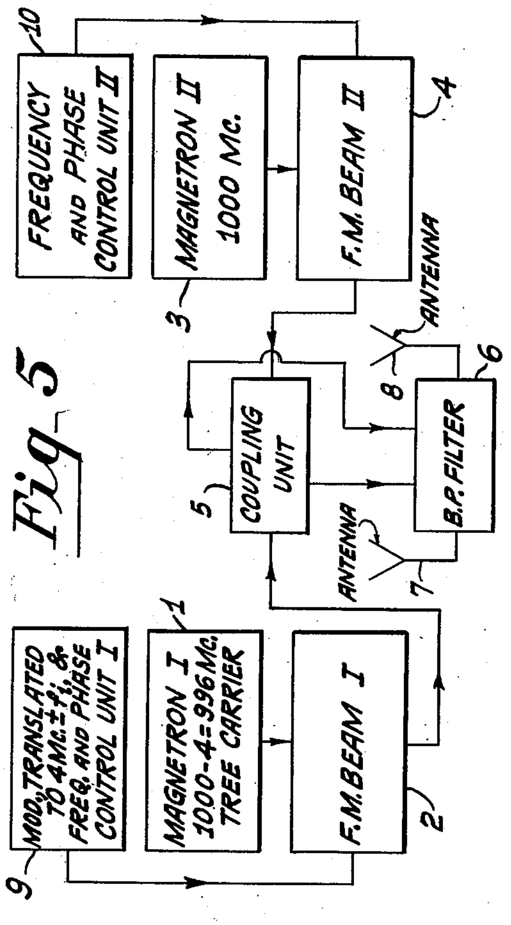
Fig. 5 is a simplified block diagram of another form of transmitting system according to this invention.
Figures 6A, 6B, 7:
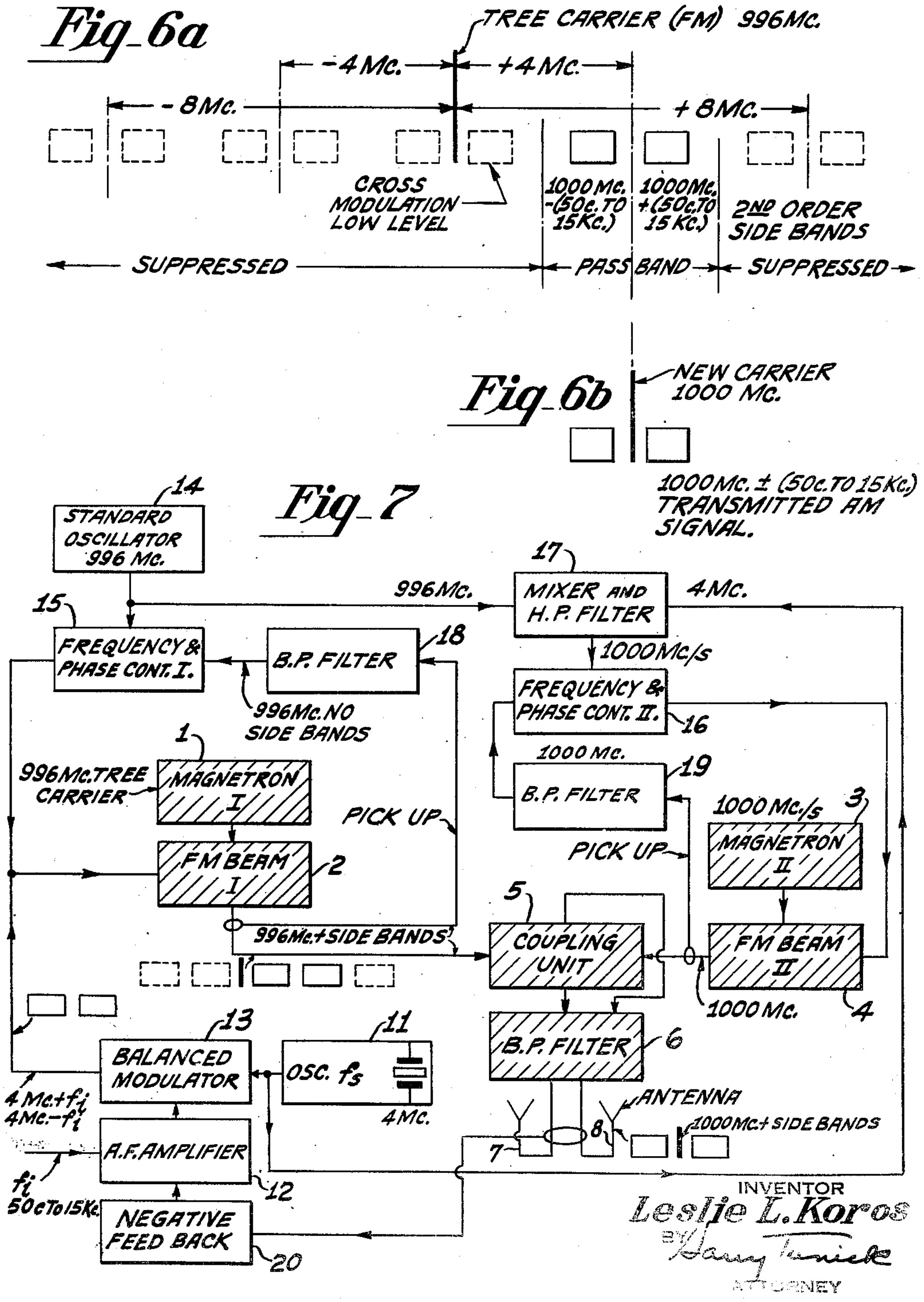
Figures 8A, 8B, 8C:
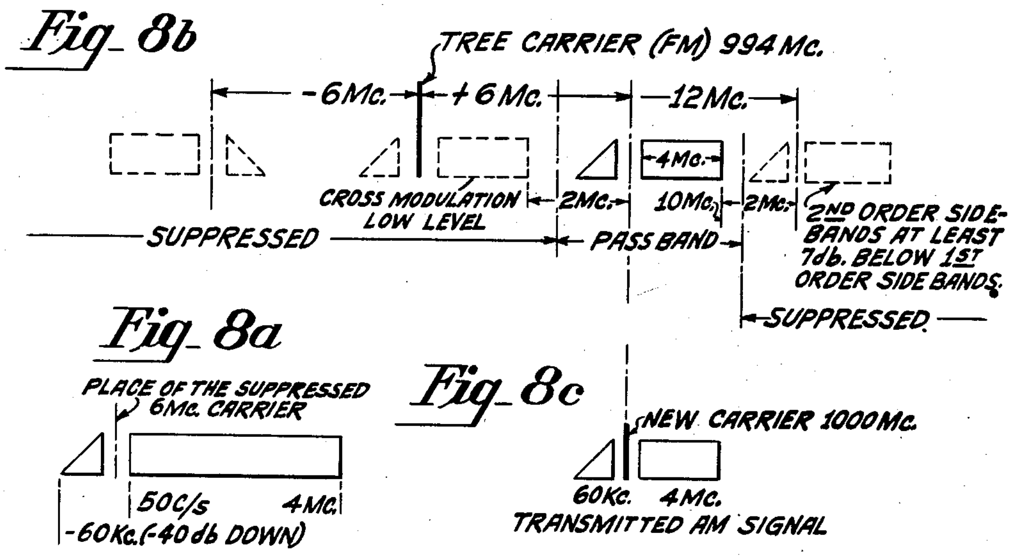
Figure 9:
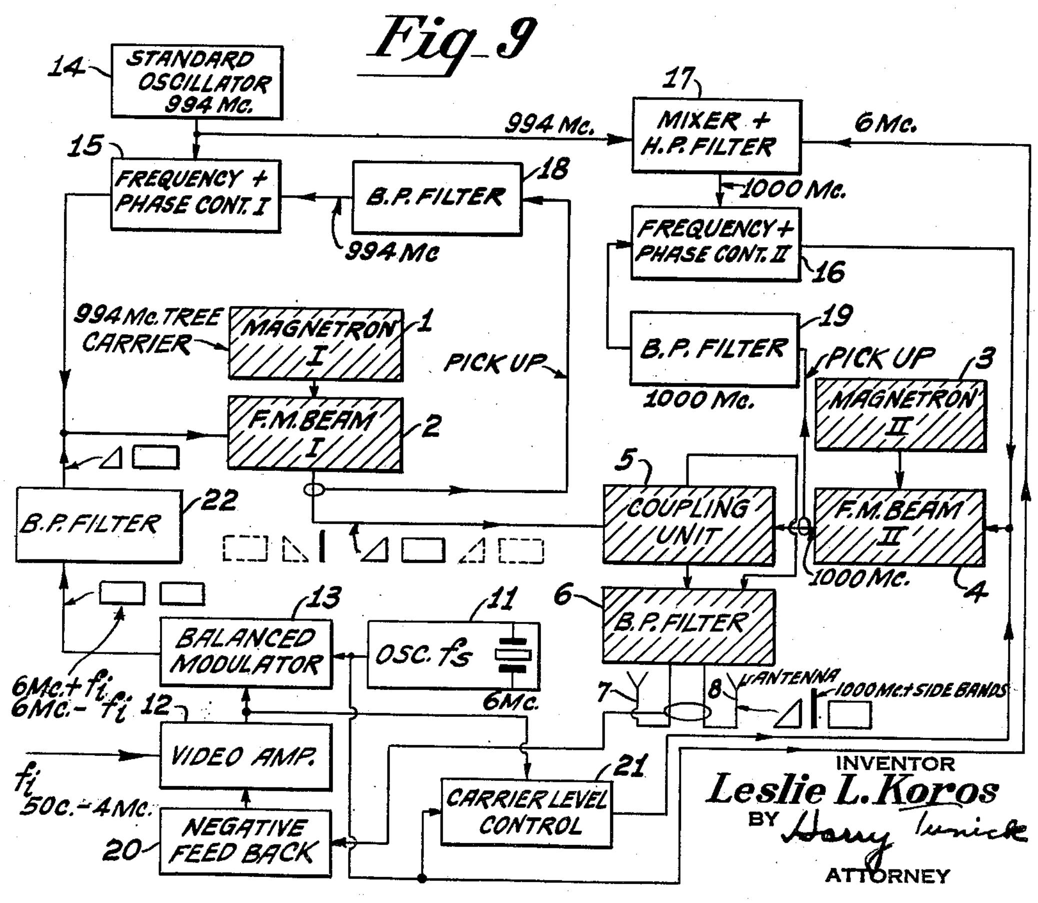
Figure 10A:
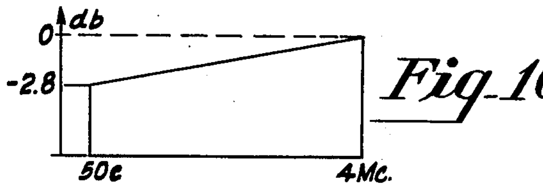
Figures 10B, 10C:
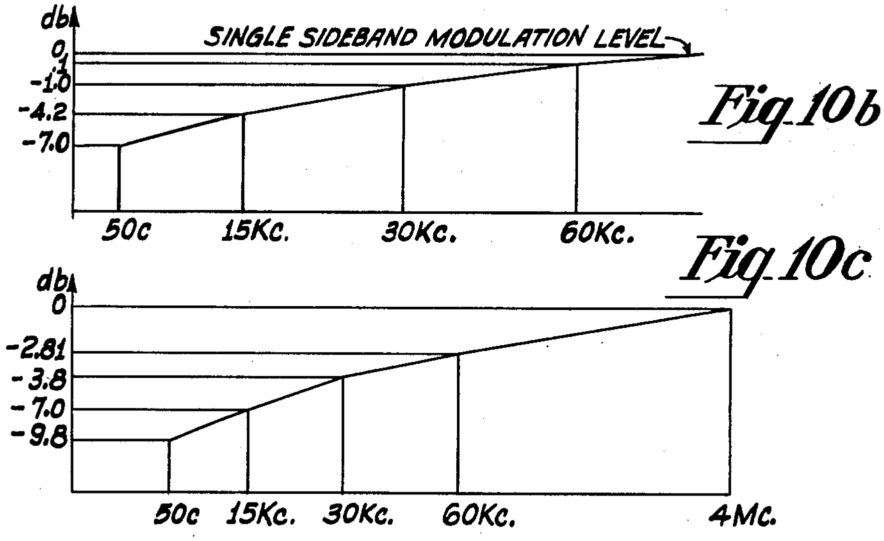
Figure 11:
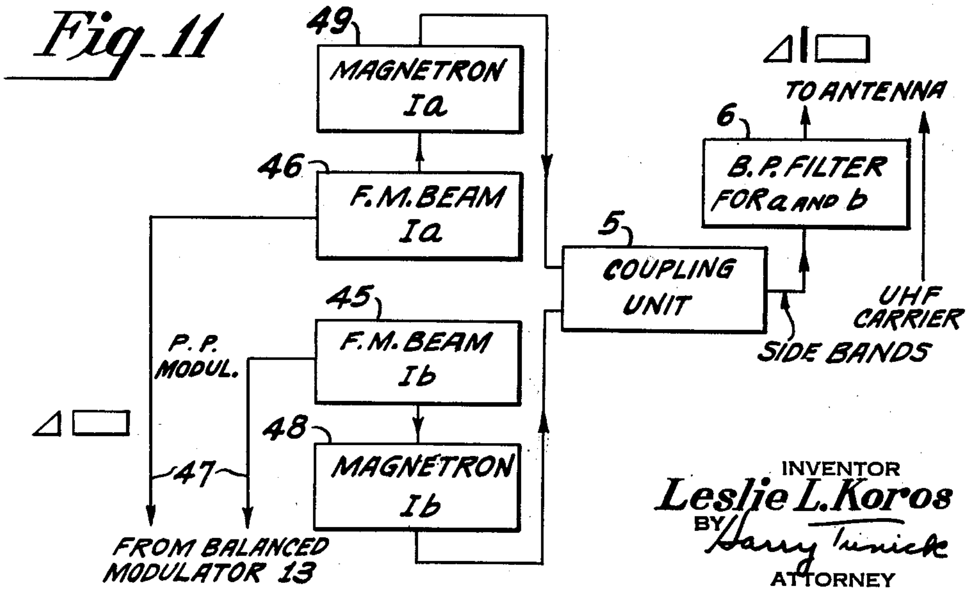
Figures 12, 14:
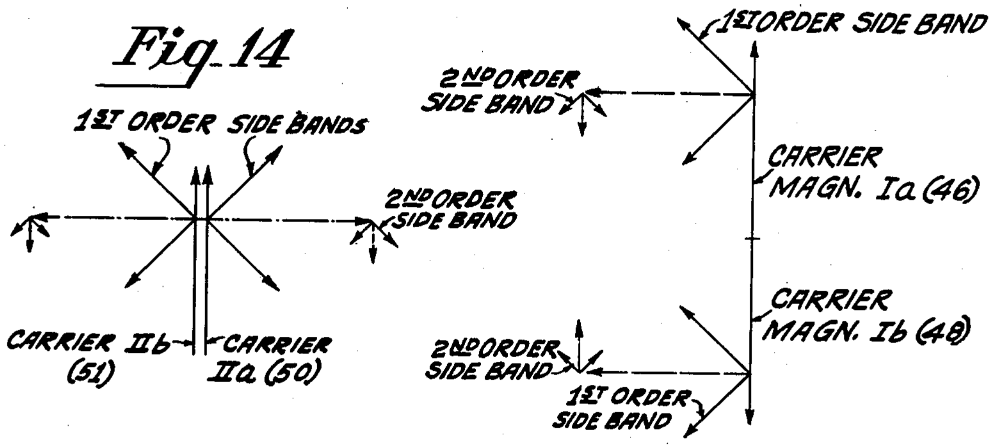
Figure 13:
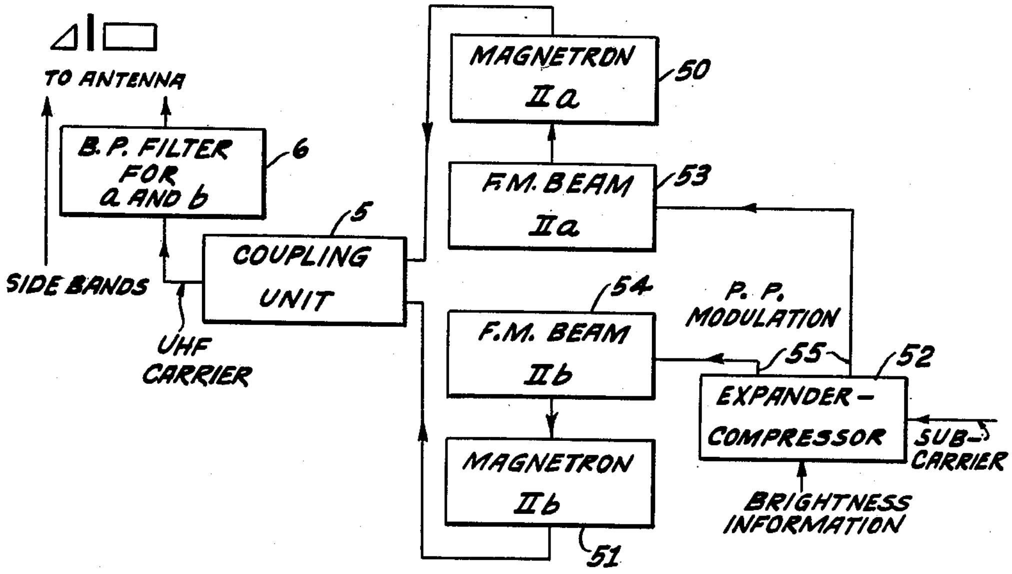

Figs. 6*a* and 6*b*, together making up Fig. 6, represent the sideband frequency distribution in the system of Fig. 5;

Fig. 7 is a more detailed block diagram of the system of Fig. 5;

Figs. 8*a*–8*c* represent the sideband frequency distribution for a single sideband broadband transmission system according to this invention;

Fig. 9 is a block diagram of a transmitting system used for producing the sideband distribution of Figs. 8*a*–8*c*;

Figs. 10*a*–10*c* are curves useful in explaining an aspect of this invention;

Fig. 11 is a block diagram of a modified arrangement of this invention;

Fig. 12 is the vector diagram for the arrangement of Fig. 11;

Fig. 13 is a block diagram of yet another modified arrangement of this invention; and Fig. 14 is the vector diagram for the arrangement of Fig. 13.

For frequencies over 500 megacycles, magnetron transmitters with absorption modulation have been proposed. Absorption modulation in its known forms has low efficiency, especially in services where a low modulation factor is used for long periods of time.

In one form of this invention, the intelligence is amplitude-modulated onto a subcarrier by a suitable modulator. The source of the subcarrier can be any kind of radio frequency generator. The produced sidebands, with or without subcarrier, frequency-modulate or phase modulate a magnetron, klystron or any source of radio frequency current at low modulation index.

Figure 1:
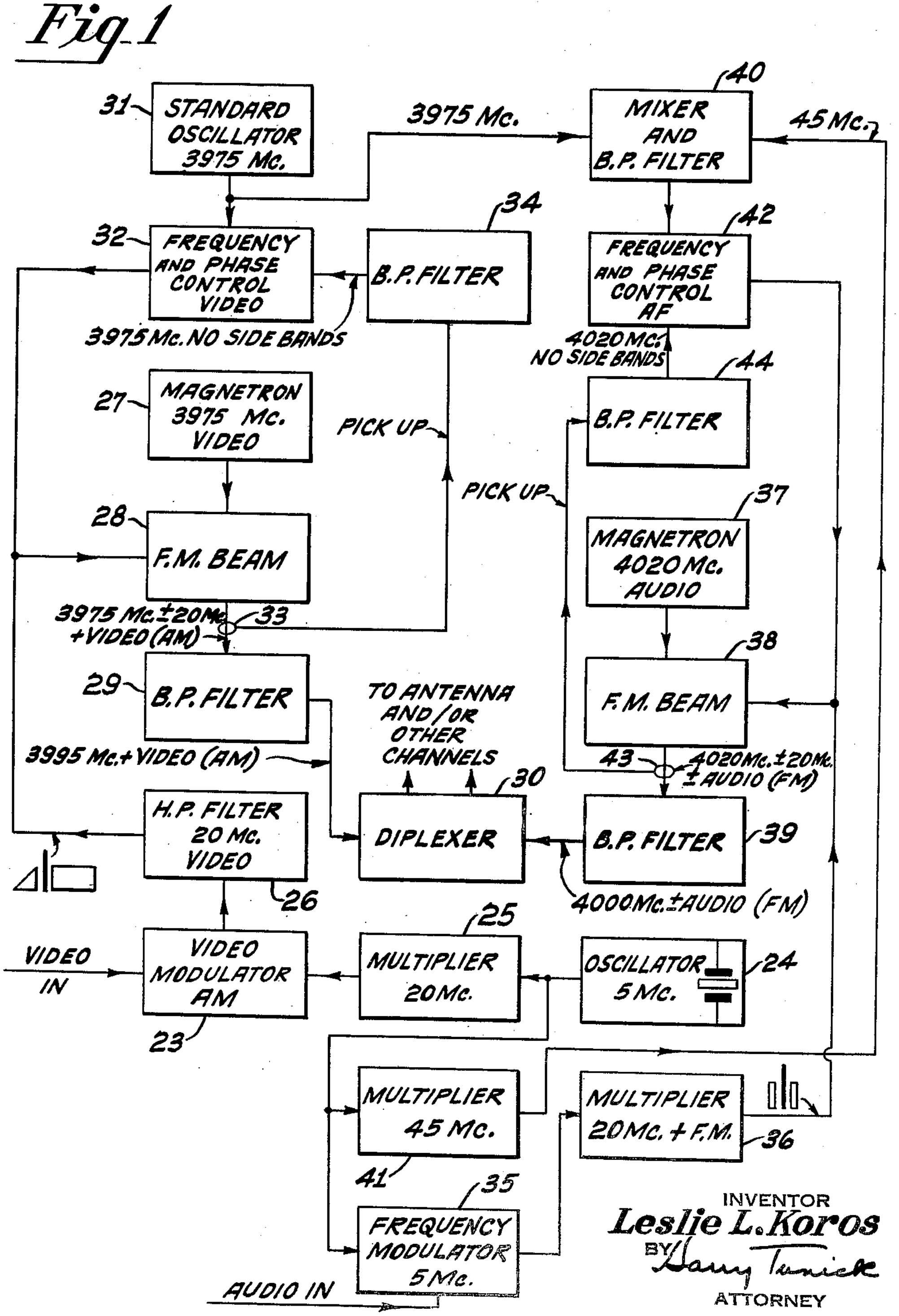

Now referring to Fig. 1, this figure discloses by means of a block diagram one form of the invention which is intended to operate for example in the 4000-megacycle band and which provides a television sound and picture transmitting system. The video or picture input is amplitude-modulated onto a 20-megacycle subcarrier in the video modulator unit 23, this subcarrier being obtained from a stable crystal-controlled 5-megacycle oscillator 24 through a frequency multiplier unit 25.

Figures 2A, 2B, 2C, 2D, 2E:
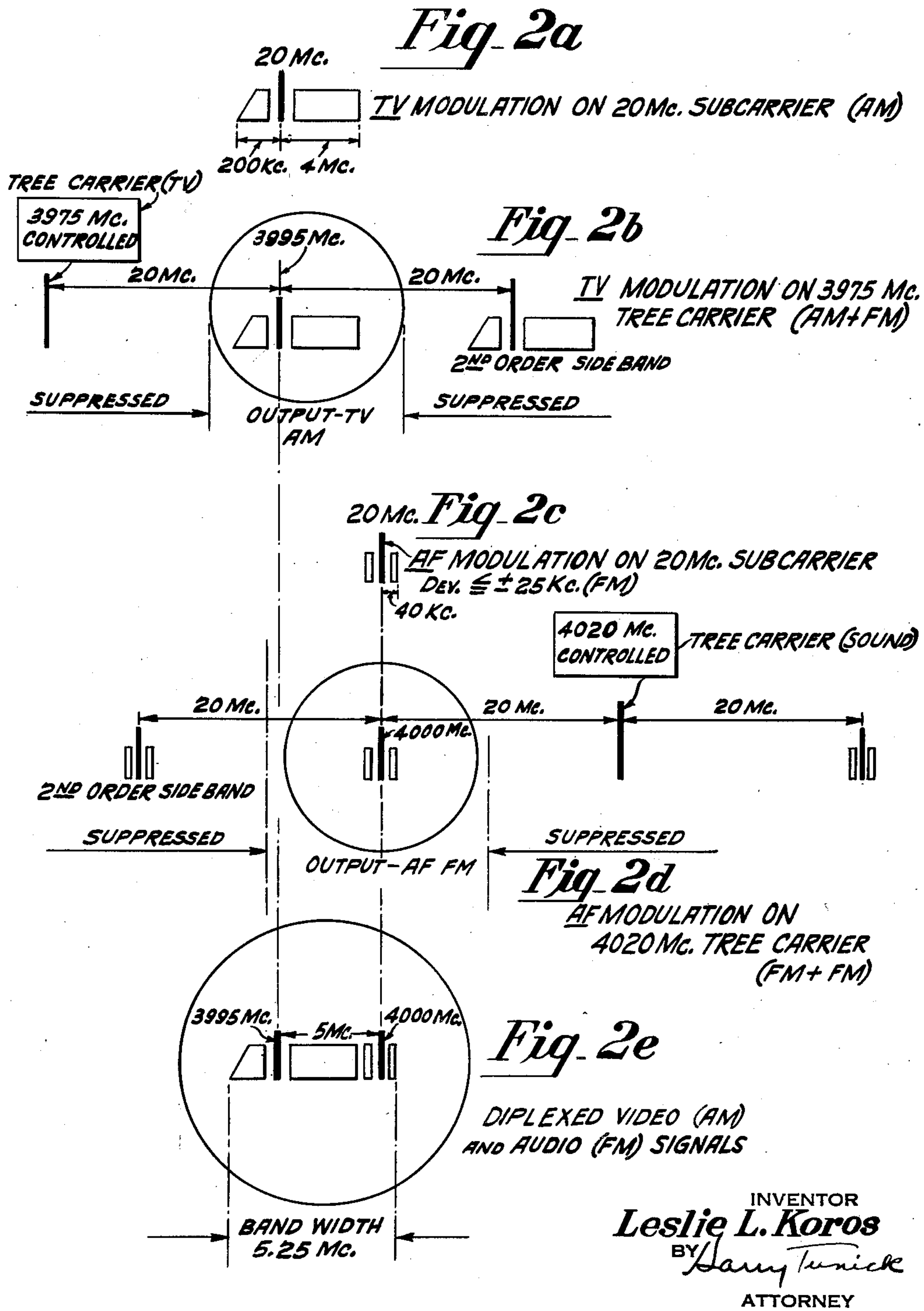

The high pass filter 26, to which the output of modulator 23 is applied, suppresses one sideband of the picture, providing in its output a television signal the sideband spectrum of which is represented in Fig. 2*a*. The 3975-megacycle magnetron 27 provides a carrier which may be termed a "tree carrier." This tree carrier source is frequency-modulated at low modulation index by the output of filter 26, through the action of an FM beam 28 which is properly coupled to magnetron 27. Band pass filter 29 suppresses the carrier of source 27 and one of the first-order sidebands and both second-order sidebands. One of the first-order sidebands of magnetron 27 is radiated through the diplexer 30, to which the output of filter 29 is supplied. The selected carrier and substantially only an upper sideband related to such carrier, represent a complete amplitude-modulated television video signal with a carrier frequency of 3975 plus 20, or3995 megacycles.

The sideband spectrum of this selected and radiated first-order sideband amplitude-modulated video television signal is represented in Fig. 2*b*, being circled in such figure. Fig. 2*b* also indicates the frequency relation and distribution of the video tree carrier itself, as well as one of the second-order sidebands. The high separation of about 20 mc. of the tree carrier and first-order sidebands makes possible an efficient carrier suppression by filter 29.

A stable frequency source or standard oscillator 31 supplies a constant frequency of 3975 megacycles to the frequency and phase control video unit 32. The output of source 27 is "picked up" by a connection or coupling 33 and is fed through the band pass filter 34 to the same control unit 32. Filter 34 separates the tree carrier frequency of 3975 mc. from its sidebands, this being made possible by the high separation of about 20 mc. of the tree carrier and first-order sidebands. Said filter passes the carrier frequency on to unit 32.

Unit 32 is a discriminator, and the direct current output of this discriminator controls the FM beam 28 of magnetron 27, according to the frequency difference between the standard oscillator and the rest frequency of magnetron 27, in such a way as to maintain the rest or mid-frequency of said magnetron at exactly 3975 megacycles.

The audio portion of the Fig. 1 system is in general the same as the video portion, with the following differences. The audio input signal is frequency (or phase) modulated onto the 5 mc. subcarrier from source 24, in unit 35. The modulated signal is multiplied up to 20 mc. in multiplier unit 36, and this frequency-modulated 20 mc. subcarrier, represented in Fig. 2*c*, is frequency-modulated, at low modulation index, onto the carrier output of a 4020 mc. "tree carrier" source 37, through the action of an FM beam 38 which is properly coupled to magnetron 37. Band pass filter 39 suppresses the carrier of source 37 and one of the first-order sidebands and both second-order sidebands, as in the video portion of the system. The selected one of the first-order sidebands is radiated through diplexer 30, to which the output of filter 39 is supplied.

The frequency distribution or sideband spectrum of this selected and radiated first-order sideband frequency-modulated audio television signal is represented in Fig. 2*d*, being circled in such figure. Fig. 2*d* also indicates the frequency relation and distribution of the sound or audio tree carrier itself, as well as one of the second-order sidebands. The high separation of about 20 mc. of the tree carrier and first-order sidebands again makes possible an efficient carrier suppression by filter 39. The audio carrier is 4020 minus 20, or 4000 megacycles.

The standard frequency for the audio transmitter is produced by the mixer and band pass filter unit 40. The 45-megacycle output of multiplier 41, which is excited from oscillator 24, is mixed with the 3975-megacycle output of oscillator 31, in unit 40, to produce the tree carrier frequency of 4020 mc. which is applied as one of the inputs to the frequency and phase control unit or discriminator unit 42. The output of source 37 is "picked up" by a connection or coupling 43 and is fed through the band pass filter

44 to the control unit 42. Filter 44 separates the tree carrier frequency of 4020 mc. from its sidebands, passing such carrier frequency on to unit 42; the band pass filter in unit 40 separates out and passes the 4020 mc. from mixer 40 to control unit 42.

The direct current output of discriminator 42 controls the FM beam 38 of magnetron 37, to maintain the rest or mid-frequency of said magnetron at 4020 megacycles.

The diplexed or composite television signal is represented in Fig. 2*e*. The width of band required for the picture and sound together is approximately 5.25 megacycles, so that more efficient utilization of the frequency spectrum available may be had.

In Figure 1, it will be noted that two separate sources 27 and 37 of carrier current are provided, the sound and picture signals separately modulating these two sources and being diplexed onto the same antenna. As a variation or modification, the sound and picture (audio and video) signals could be diplexed on the same U. H. F. carrier if desired. In this case, only a single U. H. F. carrier current source need be provided.

In another form of this invention, the intelligence is amplitude-modulated onto a subcarrier by means of a balanced modulator. The produced sidebands, without subcarrier, the subcarrier frequency itself being eliminated by the action of the balanced modulator, frequency-modulate or phase modulate a magnetron, klystron, or any source of radio frequency current, at low modulation index. First-order frequency or phase modulated sidebands are separated from the frequency-modulated carrier by filters or by other tuned circuit elements and, with a second klystron or magnetron, or any source of current, as e. g. a grid-controlled electronic device, a new carrier is added to these sidebands. The frequency or phase-modulated sidebands produce, with the new carrier, an amplitude-modulated wave. This wave has similar properties to the output of a high-level modulated class C amplifier stage or class B radio frequency amplifier stage with constant carrier.

The system as established by this invention can be applied to double sideband transmission of voice and music and to single sideband broad channel transmission of television pictures, without carrier control. The effect of adoption of carrier control can also be produced, in the form that reduction of the inserted new carrier takes place by driving the energy of the same in sidebands. This effect is realized by angularly modulating the carrier with an auxiliary frequency. The produced sidebands are suppressed by a filter.

Actually, as radio frequency current sources, at very high and ultra high frequencies, the magnetrons have the best efficiency. Therefore, the practical circuits of this invention are described in connection with magnetron tubes. The invention is not limited, however, to the use of magnetrons, nor even to very high or ultra high frequencies or to microwaves. Any source of radio frequency current, described as a magnetron oscillator in this disclosure, can be replaced by any kind of oscillator or excited amplifier. It is also possible to use combinations of magnetrons and grid-controlled electronic devices to form the wanted sources of radio frequency currents.

The amplitude-modulated wave will be described by the equation $$=E_0 \sin \omega_c t + \frac{mE_0}{2} \cos (\omega_c-\omega_i)\, t - \frac{mE_0}{2} \cos (\omega_c+\omega_i)\, t \qquad (1)$$

where:

$E_0$ is the peak carrier voltage,
$\omega_c=2\pi fc$ is the carrier frequency,
$\omega_i=2\pi fi$ is the intelligence, and $m$ is the modulation factor.

The frequency-modulated wave is represented by $$e=E_0B_0 \sin \omega_c t+E_0B_1 \sin (\omega_c+\omega_i)\, t-E_0B_1 \sin (\omega_c-\omega_i)\, t+K \qquad (2)$$

where: $E_0$, $\omega_c$ and $\omega_i$ have the same significance as in the amplitude-modulated case, $B_0$, $B_1$ are Bessel functions and K represents the following infinite members of the equation. These members have forms similar to the 2nd and 3rd members but the argument of the $(n-1)^{st}$ member is $$\omega_c \pm n\omega_i$$

Figure 3:
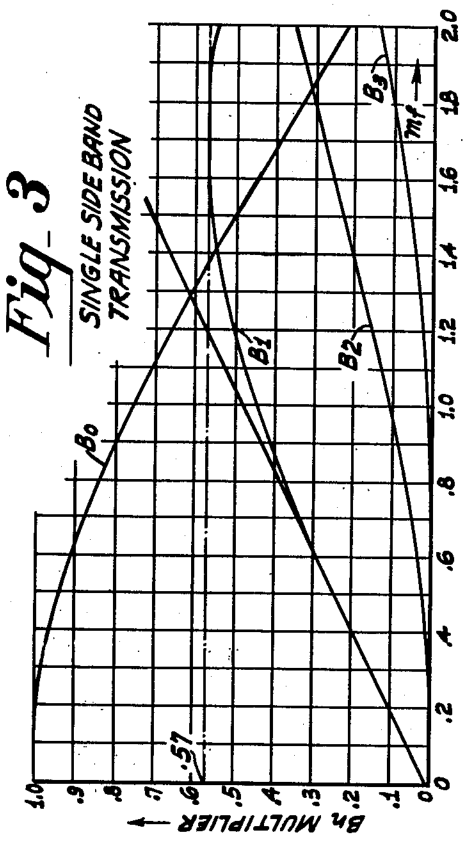

Fig. 3 represents for low modulation indices the Bessel functions $B_0$, $B_1$, $B_2$ and $B_3$ versus modulation index, $m_f$.

$$m_f=\frac{D}{fi} \qquad (3)$$

where D=frequency deviation and $$fi=\omega_i/2\pi$$

Fig. 3 demonstrates that with low modulation index the second and third order Bessel functions $B_2$ and $B_3$, and consequently the second and third order sidebands, have a very low value compared to $B_1$, which determines the first order sidebands and to $B_0$, which determines the carrier. The members of the K group are not to be taken into consideration, because they will be suppressed in this invention.

Equations 1 and 2 show that the FM wave has a similar structure to the AM wave. The main difference is in the vector angles of the carrier with the sidebands. The process in this invention to produce amplitude-modulated waves is (a) to frequency modulate a carrier and to produce mainly only first order frequency-modulated sidebands, (b) to suppress the FM carrier and higher order sidebands by filter, and (c) to insert a new carrier in 0°–180° phase relation to the vector sum of the two sidebands, or in other words, in phase quadrature to an ordinary FM type carrier. The composite of the first order frequency modulated sidebands and new carrier represents an amplitude-modulated wave. To produce a good broadband transmission, the intelligence must be amplitude-modulated onto a subcarrier by a balanced modulator before effecting step (a). Narrow band intelligence, especially of high frequency of the order of megacycles, could be frequency-modulated without a previous amplitude modulation. Several new circuits, used in this invention, will be described.

To produce first order frequency-modulated sidebands for double sideband communication transmission, the modulation index or the phase modulation in radians $m_f$ should be kept preferably below 1.07. For broadcast transmission $m_f \leqq .8$. For single sideband transmission, an $m_f \leqq 1.57$ could be used. This invention is not limited to the use of these values. They represent only practical realizations of the modulating system, according to the principles of good engineering.

Figure 4:
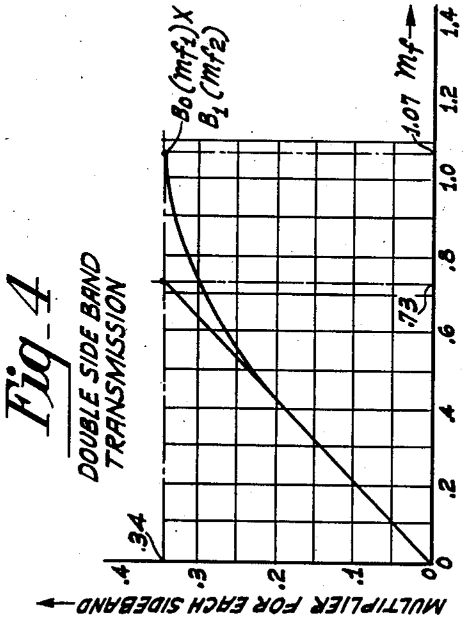
Figs. 3 and 4 are sets of curves useful in the analysis of the invention.

Fig. 4 demonstrates the first order sideband production if the carrier is modulated by two frequencies at the same time. In double sideband transmission, the two frequencies are the two sidebands $f_s+f_i$ and $f_s-f_i$. The production of the first order sidebands follows the $B_0 \times B_1$ Bessel function. $B_0$ and $B_1$ are the values belonging to the same modulation index. Generally, if two signals $f_{i1}$ and $f_{i2}$ are modulating the same FM carrier, the first order sidebands of $f_{i2}$ are produced according to the product $$B_1''=B_0(mf1)\times B1(mf2) \qquad (4)$$

and the first order sidebands of $f_{i1}$ $$B_1'=B_0(mf2)\times B1(mf1) \qquad (5)$$

Expressed in words, the first order sideband will be reduced by the factor of $B_0$.

To simplify this description, numerical values are chosen for the carrier and for the modulation band, although this invention is not necessarily limited to the use of these values. The carrier frequency can be selected in a range extending from any low frequency up to ten thousand megacycles or higher. The modulation can be only one frequency, or broad channel communication of ten megacycles or more can be transmitted. The following is only an example:

Carrier frequency $f_c$=1000 mc.
Modulation band $f_i$=50 to 15,000 c.

In common FM high fidelity broadcast transmission, a frequency deviation $D \leqq \pm 75$ kc. is ordinarily used. The choice in this example is $D \leqq \pm 3.2$ mc. and $m_f \leqq .8$. To meet this condition, the intelligence is translated to the radio frequency band. The maximum frequency of this band will be about $$\frac{3.2 \text{ mc.}}{.8}=4 \text{ mc.}$$

Consequently, we produce a subcarrier $f_s$=4 mc. The subcarrier gives better results if its frequency is stable, and any means can be applied to accomplish this, such as crystal control, for example. This subcarrier is amplitude-modulated by the intelligence of 50 c. to 15 kc./s. by means of a balanced modulator, and the two new sideband groups, of $f_s+f_i$=4 mc.+(50 c. to 15 kc.) and $f_s-f_i$=4 mc.−(50 c. to 15 kc.), are frequency-modulated onto a magnetron oscillator by means of a frequency modulation cavity. Any other type of current source and modulation system could also be utilized.

The simplified block diagram is shown in Fig. 5 and the sideband distribution in Fig. 6. The complete block diagram is shown in Fig. 7.

Fig. 5 and Fig. 6 show that magnetron I has a carrier frequency $$f_T=1000 \text{ mc.}-4 \text{ mc.}=996 \text{ mc.}$$

This carrier is the "tree carrier." The tree carrier is frequency-modulated by the frequency groups $f_T+f_i$ and $f_T-f_i$ by a balanced modulator (not shown in Fig. 5).

Fig. 6a shows the frequency distribution of the frequency-modulated tree carrier. A wave filter, e. g., of the bandpass type, separates the desired sideband group, which is 1000 mc.+$f_i$ and 1000 mc.−$f_i$($f_i$=50 to 15,000 c.) from the tree carrier and from the first and higher order sidebands below and above the tree carrier. Magnetron II produces a carrier of 1000 mc. The output of the two magnetrons is coupled to the antenna by a method which prevents any disturbing interaction between the two magnetron oscillating circuits, or two antenna elements with extremely low mutual coupling could be used. The total or resultant AM transmitted output signal is represent by Fig. 6b.

Two frequency and phase control units are employed. These control units correct the magnetron output frequencies and phase angles, comparing them with one standard frequency oscillator. There are in existence different types of frequency and phase control units which are suitable for this purpose.

Fig. 7 is a complete block diagram of the transmitter. The high power units are shaded. It may be seen that the majority of the units are of low power; therefore this invention represents good technical progress for economical transmitter design. The negative feedback system reduces the distortion and hum.

Fig. 5 is a simplified block diagram of this invention. 1 is the source of the tree carrier or sideband current, 2 is a frequency modulator for said source, 3 is the source of the carrier, 4 is a second frequency modulator for source 3, and 5 represents a unit coupling elements 1 and 3 to the antennas, 7 and 8. 5 can be a bridge circuit to prevent interaction between 1 and 3 and can be constructed by coaxial lines and cavities, or by condensers and coils. If 5 is a bridge circuit, the elements 7 and 8 coluld form one antenna system. If 5 does not separate electrically elements 1 and 3, two antenna elements 7 and 8 should be used with extremely low mutual coupling. 6 is a band pass filter, while 9 represents a modulator and a frequency and phase control unit for the current source 1. 10 is the frequency and phase control unit for current source 3.

Fig. 7 is a more detailed block diagram of one of the invented circuits. The elements 1, 2, 3, 4, 5, 6, 7, and 8 have the same function as in Fig. 5. 11 is an oscillator which produces the subcarrier $f_s$. This can be a conventional crystal-controlled oscillator, or any other source of radio frequency current. The oscillator frequency is lower than the frequencies of 1 and 3. 12 is an amplifier to feed the intelligence to the balanced modulator 13. 14 is an oscillator. To obtain good signals, 14 should be a stable oscillator. Crystal-controlled oscillator circuits can be used, if necessary, with frequency multiplier stages or any other type of stable oscillator such as an oscillator system with invar cavity in a thermostat or with gas spectrum stabilization. The frequency of 3 is the sum or difference of the frequencies of 11 and 14. 15 is the frequency and phase control unit to stabilize the frequency of 1 by comparison with the standard oscillator 14. 16 is a similar unit for the frequency of 3. The standard frequency for 16 will be produced by one of the beat frequencies of 14 and 11. 17 is the mixer unit and filter. 18 and 19 are wave filters. In special cases 18 and 19 could be bandpass filters.

18 and 19 select one predetermined frequency from the frequencies which are present in the outputs of 1 and 3. The selected frequencies are compared with the corresponding standard frequency as in the system of Fig. 1. The circuit of Fig. 7 represents an important technical advance in that the carrier of 1 is separated by $f_s$ from its sideband; this is generally a wide separation, so therefore the wave filter 18 can discriminate the carrier from the sidebands. The carriers will be compared with the standard frequencies. 20 is a negative feedback system to reduce the distortion and hum.

In operation, the intelligence $f_i$ is amplified by amplifier 12 and is amplitude-modulated onto the subcarrier $f_s$ from source 11 by means of the balanced modulator 13. The subcarrier $f_s$ is eliminated by the action of the balanced modulator, and the produced sidebands, without subcarrier, frequency or phase modulate, by means of modulator 2, the "tree carrier" source 1, at low modulation index. The upper or lower first-order frequency or phase modulated sidebands are separated from the tree carrier and from higher order sidebands by band pass filter 6. In other words, the FM or PM carrier, one of the first order sidebands and all higher order sidebands are suppressed by filter 6.

A new carrier from source 3 is added, by means of coupling unit 5, to the selected first order FM sidebands, this new carrier being in phase quadrature to an ordinary FM type carrier. The combination of the selected upper or lower first order FM or PM sidebands and the new carrier represents an amplitude-modulated wave, and this resultant or composite AM wave is transmitted from the antennas 7 and 8, the sideband spectrum of this resultant wave being represented adjacent antenna 8 in Fig. 7.

The circuit of a single sideband transmitter would be similar to that of the double sideband transmitter, except that only one of the sidebands is modulated onto the tree carrier. The lower or upper sideband is suppressed. This operation needs one additional wave filter.

We shall now consider one example for single sideband broad band transmission. The system could be used as an A. C. transmission system for television pictures. The carrier control produced in television transmitters could also be simulated. The control reduces the carrier according to the average light of the picture. The carrier reduction could be produced in this system by driving the carrier energy in sidebands. If a radio frequency carrier is frequency modulated the carrier will be reduced according to the $B_0$ Bessel function (see Fig. 3). This physical effect could be used in this invention for carrier control or for producing amplitude modulated waves, especially sidebands.

The frequency modulated beam of the magnetron II or 3 of Fig. 9 will be modulated, e. g. by the subcarrier $f_s$, by a compressor-expansor tube, e. g. an RCA 6L7. The selected frequency and tube are only examples. Any other frequency or tube could be used for the modulation of the carrier. The super-control grid of the compressor tube will be controlled by the D. C. component of the picture by a circuit of convenient time constant. This compressor tube feeds maximum excitation corresponding to white level, e. g. $m_f=2.0$, and $m_f=0$ for the black level. Consequently, the carrier will be controlled in the ratio of approximately 4.5 to 1. The low level corresponds to a reduction of the normal carrier to about 22% (white level). $m_f=0$ corresponds to full carrier input or 75% modulation (black level) which is consequently higher than the normal carrier. We choose the following example, but this invention is not limited to the use of these numbers.

Carrier frequency $f_c$=1000 mc. The modulation index for carrier control $\leq 2.0$ Modulation band $f_i$=50 c. to 4 mc. The subcarrier frequency $f_s$=6 mc.

The modulation index for the picture ≦1.57

The deviation for the frequency modulation for the picture consequently will be $$D \leqq \pm 1.57 \times 6 = \pm 9.42 \text{ mc.}$$

and for the carrier control $$D' \leqq \pm 2 \times 6 = \pm 12 \text{ mc.}$$

The tree carrier will be 1000−6=994 mc.

These numbers represent only an example. It is possible to use this invention with any carrier frequency and the value of the deviation D can be less or more than that used in this example. The value of the subcarrier $f_s$ can also be higher or lower according to the transmitter frequency. Generally, a higher value will be chosen for $f_s$ if the carrier frequency is higher, because the wave filter which separates the wanted and unwanted frequency bands can more easily be constructed for a higher carrier value if $f_s$, which represents the separation between the carrier and sidebands, is higher.

The distribution of the frequencies of the picture transmission for this example is shown in Fig. 8. Fig. 8*a* represents the television picture band after modulation on the 6 mc. subcarrier, with the lower sideband suppressed. The wave filter 22 in the system of Fig. 9 will not suppress, with sharp cut-off, the lower sideband. We assume as an example that 40 db attenuation will be produced at 60 kc., which is 1% of the subcarrier frequency. It is not necessary, however, to cut off the lower sideband to as close as 60 kc. The higher sideband and the unsuppressed part of the lower sideband, modulated onto 6 mc. by the balanced modulator 13, represent the frequency groups of 6 mc.+(50 c. to 4 mc.) and 6 mc.−(50 c. to 60 kc.). This group will be frequency modulated onto the tree carrier of 994 mc. The 2 $f_i$ group remains insignificant if the modulation index of the balanced modulator is low. The 2 $f_s$ group is out of the passband. With a bandpass filter 6 the tree carrier and all of the lower frequency modulated sidebands and the second and higher order upper sidebands are suppressed, as represented in Fig. 8*b*. The tree carrier is separated in this example by about 6 mc. from the first order sidebands. This high separation makes it relatively easy to suppress the undesired lower frequency band. However, low power beat frequencies produced by contemporaneous modulation of the carrier by more than one frequency, could be present at about −2 mc. distance. The second-order sidebands are about 2 mc. separated from the first order sidebands. This shorter distance makes a filter with sharper cut-off necessary. The strongest frequency in the second order sideband produced by 100% modulation is at least 7 db below the first order sideband, and therefore it is 13 db below the carrier of the amplitude-modulated signal. The subcarriers produced by the modulation of the tree carrier are separated from the main carrier by 6 mc. and multiples thereof; therefore the same filter suppresses all of them, if it is designed according to requirements.

To the first order frequency modulated sideband group is added the new carrier produced by magnetron II, and therefore the amplitude modulated signal represented in Fig. 8*c* is completed. The level of the new carrier can be chosen to produce a 100% modulated transmission, but can also be increased to any desired level.

Fig. 9 represents a block diagram of a circuit used in this invention for producing the picture of Figs. 8*a*–8*c*. This circuit is for use especially with broadband transmission. The elements 1, 2, 3, 4, 5, 6, 7, 8, 11, 12, 13, 14, 15, 16, 17, 18, 19 and 20 have the same function as described above in connection with Fig. 7, and with Fig. 5. 21 is a carrier level control unit. One expander circuit, e. g. such as used generally with the 6L7 tubes, is controlled by the D. C. component of the television picture. The D. C. component gives the average light information of the picture. For a black picture, high carrier level is needed. Therefore, the excitation which the expander circuit 21 delivers to the frequency modulator 4 is low. For white pictures, the carrier level is low; therefore 4 receives high excitation from the expander and the energy of the carrier, produced by 3, is driven to the sidebands. These sidebands are suppressed by wave filter 6. The auxiliary frequency for 21 is in this specific example the subcarrier frequency of 11, but any other frequency can be used, provided that the auxiliary frequency is lower than the carrier frequency and that the produced sideband is attenuated by 6. 22 is a wave filter. It could be a high-pass or low-pass filter. It attenuates, consequently, the lower or higher amplitude-modulated sidebands which are produced by the balanced modulator 3. 22 will be designed in some cases as a band-pass filter to suppress parasitic modulation which could accidentally be produced by 13.

The sidebands produced by frequency modulation are not in linear relationship to the amplitude of the incoming intelligence. I can use the figures of the example discussed before as an illustration. In the case of broadband transmission, as in the selected example, the upper end of the signal will be modulated less because the maximum deviation is constant and the modulation factor, $m_f$, decreases from $$m_f = \frac{9.42 \text{ mc.}}{6 \text{ mc.}} = 1.57 \text{ to } m_f = \frac{9.42 \text{ mc.}}{6 \text{ mc.} + 4 \text{ mc.}} = .94$$

Fig. 3 shows that the first order sideband ($B_1$) has an approximately linear amplitude loss of 2.8 db between $m_f$=1.57 and .94. This loss can be compensated by the preamplifier according to the frequency response represented by Fig. 10*a*. This compensation does not introduce overmodulation because, in the upper end of the passband, less energy is generally transmitted. The preamplifier needs another compensation, due to the fact that in the low frequency region double sideband transmission will be produced because the low level sideband filter does not cut off sharply enough (according to my example, 60 kc. for 40 db and about 30 kc. for 20 db attenuation). In double sideband modulation, higher peak power can be produced than in single sideband modulation. Fig. 10*b* shows the correction in the video amplifier to compensate for the transition process from the two sidebands to the one sideband transmission to assure constant peak power. This is only an example. For some applications, the radiation of more energy in the double sideband part of the transmission may be desirable. In Fig. 10*b* it will be assumed that the filter cuts the sideband between 0 and 60 kc. in linear relation from 0 db to 40 db. Fig. 10*c* shows a combination of Fig. 10*a* and Fig. 10*b*. Fig. 10*c* is the wanted frequency response of the video amplifier in this example to produce constant peak power output with constant video input. Obviously, this invention is not limited to use of frequency correction as shown in Figures 10*a*, 10*b* or 10*c*, and, obviously, the frequency-response correction can be effected at any stage following the video amplifier, as for example on the modulated subcarrier. These figures represent only examples. In the case of a phase-modulated R. F. source, this kind of correction is not necessary.

The possibility exists to utilize both the upper and lower sidebands of the subcarrier $f_s$ by inserting two new carriers. In this form two amplitude-modulated carriers will be produced, separated by 2 $f_s$. If, e. g., an $f_s$ of 4 mc. is chosen, the two transmitters are separated by 8 mc. The two transmitters together have improved efficiency because only one sideband source is needed for both. The wave length difference between the twin transmitters, although it is relatively small, could aid in special cases to improve the reception of important communications.

The sources of distortion in the present system are different from the sources of distortion in the class B or plate-modulated class C systems. No harmonic distortion of the intelligence will be produced in the frequency modulation process, because this kind of distortion will be produced over the subcarrier frequencies, and the second and higher harmonics of the subcarrier are in most cases suppressed. Therefore, the harmonic distortion is eliminated.

The sources of the distortion in this system are the change of the modulation index with the frequency, the non-linear relation of the modulation index to sideband amplitude, and cross-modulation due to complex waveform of the audio input. In the forms of the invention using an inserted carrier, phase modulation of the same can introduce distortion. The different kinds of distortion which are inherently present in the system can be substantially eliminated by an over-all negative feedback.

Table A shows the approximate values of distortion which can be expected in the new system, assuming the highest possible efficiency for the system. For lower system efficiencies, the distortion would be less.

| | | | |
|---|---|---|---|
| Double or single sideband transmission with negative feedback. | less than 2% | Television picture transmission picture details. | less than 10% |
| Double sideband transmission without feedback. | 10% | Television synchronizing pulse transmission. | 20% |

There have been described above, various arrangements for producing an amplitude-modulated wave with frequency-modulated sidebands. Two additional generation circuits and one new carrier control circuit (for TV picture brightness information) are shown in Figs. 11 and 13.

Now referring to Fig. 11, this figure represents a simplified block diagram of a balanced sideband generator according to this invention. In this figure, elements the same as those described previously are given the same reference numerals. The intelligence is amplitude-modulated onto a subcarrier by means of a balanced modulator, as in Fig. 9. The subcarrier frequency could be chosen to be 6 mc., for example. For TV picture transmission, the sideband currents are flowing through a vestigial sideband filter.

The particular first-order sidebands selected, without subcarrier (the subcarrier being eliminated by the action of the balanced modulator) frequency or phase modulate, by respective FM beams 45 and 46 through push-pull modulation connections 47, two radio frequency current sources 48 and 49, in a balanced modulator circuit. As an example, the U. H. F. tree carrier frequency of sources 48 and 49 could be 994 megacycles.

Fig. 12 is a vector diagram for the modulator of Fig. 11. The two "tree carriers" of the magnetrons 46 and 48 are 180° out of phase, and the modulation is push-pull.

The two modulated tree carriers, from 48 and 49, and the U. H. F. carrier from a source such as 3 (not shown), are coupled by means of a coupling unit 5 to one antenna system. The frequencies of the tree carriers and the even order sidebands of the modulation process are canceled out by the push-pull or balanced modulation.

The requirements for the band-pass filter 6 are lower than in the single-ended circuits, such as that of Fig. 9.

The advantages of the balanced frequency modulator of Fig. 11 are simplified filter design and reduced distortion.

The carrier shift in the Fig. 9 circuit is produced by driving the carrier energy into the sidebands of a subcarrier frequency, the sidebands produced being suppressed by filter 6. According to Fig. 13, the same system is used, but the carrier is produced by two magnetrons 50 and 51 the outputs of which are coupled to the antenna through a coupling unit 5. The brightness information is amplitude-modulated onto a subcarrier by means of an expander-compressor device or unit 52. The sidebands selected in the output of unit 52 frequency or phase modulate, by respective FM beams 53 and 54 through push-pull modulation connections 55, the two magnetron sources 50 and 51, in a balanced modulator circuit.

The two carriers are added together, and the sidebands are produced, in push-pull. Therefore, the odd order sidebands are cancelled out in the antenna.

The resultant U. H. F. carrier, from 50 and 51, and a source of sideband current, from a source such as 1 (not shown), are coupled by means of a coupling unit 5, which is not identical with unit 5 in Fig. 11 but which may be constructed in a similar manner, to one antenna system.

Fig. 14 is a vector diagram for the arrangement of Fig. 13.

As a consequence of the balance of the Fig. 13 system, the antenna filter 6, which is not identical with filter 6 in Fig. 11, can have less attenuation for the first order sidebands. The circuit disclosed here provides the possibility of using a lower deviation than ±12 mc. for the FM magnetron to produce maximum carrier shift. If the subcarrier for this service has a frequency of 3 mc., a modulation factor, $m_f$, of 2 is obtained with ±6 mc. deviation.

The advantage of the push-pull carrier shift circuit of Fig. 13 is that the maximum deviation of the magnetron can be half as high as in the case of a single tube.

Sidebands could be produced by balanced phase modulated magnetrons or klystrons without utilizing a subcarrier. The circuit for accomplishing this would be the same as that shown in Fig. 11, but the sideband filter 6 is not needed and, of course, no first balanced modulator is used.

The vector diagram for single tone input is the same as shown in Fig. 12. The even harmonics are balanced out. In this circuit, all of the harmonics which are not balanced out represent distortion, because they are produced directly in the input intelligence, and not over a subcarrier as before.

The amplitude-modulated carrier is added to the sidebands as in the circuits described previously. In such a system, single sideband transmission can be produced only by an antenna filter.

In the systems previously described, the sideband energy is produced by a process of frequency modulation. However, it is within the scope of this invention to produce such energy by a process of absorption modulation, if desired.

It may be seen, from the foregoing, that a simple and inexpensive amplitude-modulated transmitter arrangement has been devised.

What I claim as my invention is as follows:

1. In a system for transmitting amplitude modulated signals on a radio frequency carrier, a source of carrier current, a source of subcarrier current, means for amplitude modulating said second-named source by signals to be transmitted, means for frequency modulating said first-named source by the amplitude modulated output of said second-named source at modulation indices less than 1.57, and means for selecting one of the sideband groups resulting from said frequency modulation.

2. The method of transmitting signals, which consists in producing carrier energy, producing subcarrier energy, amplitude modulating the subcarrier energy by signals, frequency modulating the carrier energy by the amplitude modulated subcarrier energy at modulation indices less than 1.57, and selecting one of the sideband groups resulting from the last-named modulation process.

3. In a system for transmitting amplitude modulated signals on a radio frequency carrier, a source of carrier current, a source of subcarrier current, means for amplitude modulating said second-named source by signals to be transmitted, means for substantially suppressing one sideband resulting from said amplitude modulation, means for frequency modulating said first-named source, by the amplitude modulated sideband passed by said suppressing means, at modulation indices less than 1.57, and means for selecting one of the sideband groups resulting from said frequency modulation.

4. The method of transmitting signals, which consists in producing carrier energy, producing subcarrier energy, amplitude modulating the subcarrier energy by signals, selecting one sideband resulting from said amplitude modulation process, frequency modulating the carrier energy by the selected sideband at modulation indices less than 1.57, and selecting one of the sideband groups resulting from the last-named modulation process.

5. In a system for transmitting amplitude modulated television signals on a radio frequency carrier, especially for directional television relay service, a source of carrier current, a source of subcarrier current, means for amplitude modulating said second-named source by television signals to be transmitted, a wave filter for substantially suppressing one sideband resulting from said modulation, means for frequency modulating said first-named source, by the amplitude modulated sideband passed by said filter, at modulation indices less than 1.57, and a wave filter for selecting one of the sideband groups resulting from said frequency modulation.

6. In a system for transmitting television video signals by amplitude modulation and audio signals by frequency modulation, two sources of carrier current, means for producing a subcarrier current, means for producing another subcarrier current, means for amplitude modulating one subcarrier by video signals to be transmitted, means for frequency modulating the other subcarrier by audio signals to be transmitted, means for frequency modulating one of said sources by the amplitude modulated subcarrier, means for frequency modulating the other of said sources by the frequency modulated subcarrier, separate filters for selecting one of the sideband groups from each of the frequency modulated carriers, and means for coupling the two selected sideband groups which appear in the outputs of the corresponding filters to a common output circuit.

7. In a system for transmitting television video signals by amplitude modulation and audio signals by frequency modulation, two sources of carrier current, means for producing a subcarrier current of a predetermined frequency, means for producing a subcarrier current of another frequency, means for amplitude modulating one subcarrier by videa signals to be transmitted, means for substantially suppressing one sideband resulting from said amplitude modulation, means for frequency modulating the other subcarrier by audio signals to be transmitted, means for frequency modulating one of said sources by the amplitude modulated sideband passed by said suppressing means, means for frequency modulating the other of said sources by the frequency modulated subcarrier, separate filters for selecting one of the sideband groups from each of the frequency modulated carriers, and means for coupling the two selected sideband groups which appear in the outputs of the corresponding filters to a common output circuit.

8. The method of transmitting television signals, which consists in producing two carriers, producing two subcarriers, amplitude modulating one subcarrier by video signals, frequency modulating the other subcarrier by audio signals, frequency modulating one carrier by the amplitude modulated subcarrier, frequency modulating the other carrier by the frequency modulated subcarrier, selecting one of the sideband groups from each of the frequency modulated carriers, and radiating the two selected sideband groups.

9. In a system for transmitting amplitude modulated signals on a radio frequency carrier, a first source of carrier current, a source of subcarrier current, a balanced modulator for amplitude modulating said second-named source by signals to be transmitted, means for frequency modulating said first source by the amplitude modulated output of said second-named source, means for selecting one of the first order sidebands resulting from said frequency modulation, a second source of carrier current having a frequency which is the resultant of a combination of the frequencies of said first source and of said subcarrier current source, and a common output circuit coupled to the output of said selecting means and to said second source of carrier current.

10. In a system for transmitting amplitude modulated signals on a radio frequency carrier, a first source of carrier current, a source of subcarrier current, a balanced modulator for amplitude modulating said second-named source by signals to be transmitted, means for frequency modulating said first source by the amplitude modulated output of said second-named source, means for selecting one of the first order sidebands resulting from said frequency modulation, a second source of carrier current having a frequency which is the sum of the frequencies of said first source and of said subcarrier current source, and a common output circuit coupled to the output of said selecting means and to said second source of carrier current.

11. A system for transmitting amplitude modulated signals, comprising a source of carrier current, a separate source of sideband current, means coupling both of said sources to a common output circuit, and means for modulating the frequency of said sideband current source in accordance with signals to be transmitted.

12. A system according to claim 11 wherein both of said sources are magnetrons.

13. A system according to claim 11 wherein means are provided for controlling the level of the carrier in accordance with direct current component information contained in the composite signal input to said modulating means.

14. A system according to claim 11 wherein said carrier current source has coupled thereto means for modulating the frequency thereof.

15. A system according to claim 11 wherein each of said sources has coupled thereto a separate frequency modulator device.

16. A system for transmitting amplitude modulated signals, comprising a source of carrier current, a separate source of sideband current, a frequency modulator device for modulating the frequency of said sideband current source in accordance with signals to be transmitted, a frequency modulator device coupled to said carrier current source, a source of auxiliary alternating current of lower frequency than the carrier, an expander-compressor control unit, means coupling the input of said unit to said source of auxiliary alternating current and to a control signal source, means coupling the output of said unit to one of said frequency modulator devices, and means coupling said source of carrier current and said source of sideband current to a common output circuit.

17. A system for transmitting amplitude modulated signals, comprising a source of carrier current, a separate source of sideband current, a frequency modulator device for modulating the frequency of said sideband current source in accordance with signals to be transmitted, a frequency modulator device coupled to said carrier current source, a source of sub-carrier current, a balanced amplitude modulator, means coupling the input of said amplitude modulator to said subcarrier source and to the source of signals to be transmitted, means coupling the output of said amplitude modulator to one of said frequency modulator devices, an expander-compressor control unit, means coupling the input of said unit to said subcarrier source and to the signal input of said amplitude modulator, means coupling the output of said unit to the other of said frequency modulator devices, and means coupling said source of carrier current and said source of sideband current to a common output circuit.

18. A system for transmitting amplitude modulated signals, comprising a source of carrier current, a separate source of sideband current, a frequency modulator device for modulating the frequency of said sideband current source in accordance with signals to be transmitted, a frequency modulator device coupled to said carrier current source, a source of subcarrier current, a balanced amplitude modulator, means coupling the input of said amplitude modulator to said subcarrier source and to the source of signals to be transmitted, means coupling the output of said amplitude modulator to said first-named frequency modulator device, an expander-compressor control unit, means coupling the input of said unit to said subcarrier source and to the signal input of said amplitude modulator, means coupling the output of said unit to said second-named frequency modulator device, and means coupling said source of carrier current and said source of sideband current to a common output circuit.

19. A system for transmitting amplitude modulated signals comprising a source of carrier current, a separate source of sideband current, a frequency modulator device for modulating the frequency of said sideband current source in accordance with signals to be transmitted, a frequency modulator device coupled to said carrier current source, a source of subcarrier current, a balanced amplitude modulator, means coupling the input of said amplitude modulator to said subcarrier source and to the source of signals to be transmitted, means coupling the output of said amplitude modulator to one of said frequency modulator devices to frequency modulate the corresponding source, an expander-compressor control unit, means coupling the input of said unit to said subcarrier source and to the signal input of said amplitude modulator, means coupling the output of said unit to the other of said frequency modulator devices, means for selecting one of the sideband groups resulting from said last-named frequency modulation, and means coupling said source of carrier current and said source of sideband current to a common output circuit through said selecting means.

20. A system for transmitting amplitude modulated signals, comprising a source of carrier current, a separate source of sideband current, means coupling both of said sources to a common output circuit, and means for modulating the frequency of said sideband current source, in accordance with signals to be transmitted, at modulation indices less than 1.57, where the modulation index is the frequency deviation divided by the modulating frequency.

21. A system for transmitting amplitude modulated signals, comprising a signal input channel, an amplitude modulator, a source of subcarrier current, means coupling the input of said modulator to said source and to said input channel, a first source of radio frequency energy, a frequency modulator coupled to said first source for modulating the frequency thereof, means coupling the output of said amplitude modulator to said frequency modulator as a modulating signal for the same, a second source of radio frequency energy, and means coupling the outputs of said first and second sources to a common radiating means.

22. A system for transmitting amplitude modulated signals, comprising a signal input channel, an amplitude modulator, a source of subcarrier current, means coupling the input of said modulator to said source and to said input channel, a first source of radio frequency energy, a frequency modulator coupled to said first source for modulating the frequency thereof, means coupling the output of said amplitude modulator to said frequency modulator as a modulating signal for the same, a standard oscillator of substantially constant frequency, a frequency control unit having its output coupled to said frequency modulator for controlling the rest frequency of said first source, means coupling the input of said unit to the output of said first source and to the output of said standard oscillator for comparing the frequencies of such outputs in said unit to produce in the output thereof a voltage proportional to the difference between the compared frequencies, a second source of radio frequency energy the frequency of which differs from the rest frequency of said first source by the frequency of said subcarrier source, a second frequency modulator coupled to said second source for modulating the frequency thereof, a second frequency control unit having its output coupled to said second frequency modulator for controlling the frequency of said second source, a mixer unit for mixing the outputs of said standard oscillator and of said subcarrier source, means coupling the input of said second unit to the output of said second source and to the output of said mixer unit for comparing the frequencies of such outputs in said second unit to produce in the output thereof a voltage proportional to the difference between such compared frequencies, and means coupling the outputs of said first and second sources to a common output circuit.

23. A system for transmitting amplitude modulated signals, comprising a signal input channel, a balanced amplitude modulator, a source of subcarrier current, means coupling the input of said modulator to said source and to said input channel, a first source of sideband current, a frequency modulator coupled to said first source for modulating the frequency thereof, means coupling the output of said amplitude modulator to said frequency modulator as a modulating signal for the same, a standard oscillator of substantially constant frequency, a frequency control unit having its output coupled to said frequency modulator for controlling the rest frequency of said first source, means coupling the input of said unit to the output of said first source and to the output of said standard oscillator for comparing the frequencies of such outputs in said unit to produce in the output thereof a voltage proportional to the difference between the compared frequencies, a second source of carrier current the frequency of which differs from the rest frequency of said first source by the frequency of said subcarrier source, a second frequency modulator coupled to said second source for modulating the frequency thereof, a second frequency control unit having its output coupled to said second frequency modulator for controlling the frequency of said second source, a mixer unit for mixing the outputs of said standard oscillator and of said subcarrier source, means coupling the input of said second unit to the output of said second source and to the output of said mixer unit for comparing the frequencies of such outputs in said second unit to produce in the output thereof a voltage proportional to the difference between such compared frequencies, and means coupling the outputs of said first and second sources to a common output circuit.

24. A system for transmitting amplitude modulated signals, comprising a signal input channel, a balanced amplitude modulator, a source of subcarrier current, means coupling the input of said modulator to said source and to said input channel, a first source of sideband current, a frequency modulator coupled to said first source for modulating the frequency thereof, means coupling the output of said amplitude modulator to said frequency modulator as a modulating signal for the same to thereby frequency modulate said first source, a standard oscillator of substantially constant frequency, a frequency control unit having its output coupled to said frequency modulator for controlling the rest frequency of said first source, means coupling the input of said unit to the output of said first source and to the output of said standard oscillator for comparing the frequencies of such outputs in said unit to produce in the output thereof a voltage proportional to the difference between the compared frequencies, a second source of carrier current the frequency of which differs from the rest frequency of said first source by the frequency of said subcarrier source, a second frequency modulator coupled to said second source for modulating the frequency thereof, a second frequency control unit having its output coupled to said second frequency modulator for controlling the frequency of said second source, a mixer unit for mixing the outputs of said standard oscillator and of said subcarrier source, means coupling the input of said second unit to the output of said second source and to the output of said mixer unit for comparing the frequencies of such outputs in said second unit to produce in the output thereof a voltage proportional to the difference between such compared frequencies, means for selecting one of the sideband groups resulting from the frequency modulation of said first source, and means coupling the outputs of said first and second sources to a common output circuit through said selecting means.

25. A system for transmitting amplitude modulated signals, comprising a signal input channel, a balanced amplitude modulator, a source of subcarrier current, means coupling the input of said modulator to said source and to said input channel, a first source of sideband current, a frequency modulator coupled to said first source for modulating the frequency thereof, means coupling the output of said amplitude modulator to said frequency modulator as a modulating signal for the same to thereby frequency modulate said first source, a standard oscillator of substantially constant frequency, a frequency control unit having its output coupled to said frequency modulator for controlling the rest frequency of said first source, means coupling the input of said unit to the output of said first source, said last-named means having in series therein a wave filter which passes substantially only the carrier frequency of said first source, means coupling the input of said unit also to the output of said standard oscillator, whereby the frequencies of such outputs are compared in said unit to produce in the output thereof a voltage proportional to the difference between the compared frequencies, a second source of carrier current the frequency of which differs from the rest frequency of said first source by the fequency of said subcarrier source, a second frequency modulator coupled to said second source for modulating the frequency thereof, a second frequency control unit having its output coupled to said second frequency modulator for controlling the frequency of said second source, a mixer unit for mixing the outputs of said standard oscillator and of said subcarrier source, means coupling the input of said second unit to the output of said second source and to the output of said mixer unit for comparing the frequencies of such outputs in said second unit to produce in the output thereof a voltage proportional to the difference between such compared frequencies, means for selecting one of the sideband groups resulting from the frequency modulation of said first source, and means coupling the outputs of said first and second sources to a common output circuit through said selecting means.

26. A system for transmitting amplitude modulated signals, comprising a signal input channel, a balanced amplitude modulator, a source of subcarrier current, means coupling the input of said modulator to said source and to said input channel, a first source of sideband current, a frequency modulator coupled to said first source for modulating the frequency thereof, means coupling the output of said amplitude modulator to said frequency modulator as a modulating signal for the same to thereby frequency modulate said first source, a standard oscillator of substantially constant frequency, a frequency control unit having its output coupled to said frequency modulator for controlling the rest frequency of said first source, means coupling the input of said unit to the output of said first source, said last-named means having in series therein a wave filter which passes substantially only the carrier frequency of said first source, means coupling the input of said unit also to the output of said standard oscillator, whereby the frequencies of such outputs are compared in said unit to produce in the output thereof a voltage proportional to the difference between the compared frequencies, a second source of carrier current the frequency of which differs from the rest frequency of said first source by the frequency of said subcarrier source, a second frequency modulator coupled to said second source for modulating the frequency thereof, a second frequency control unit having its output coupled to said second frequency modulator for controlling the frequency of said second source, a mixer unit for mixing the outputs of said standard oscillator and of said subcarrier source, means coupling the input of said second unit to the output of said second source, said last-named means having in series therein a wave filter which passes substantially only the carrier frequency of said second source, means coupling the input of said second unit also to the output of said mixer unit, whereby the frequencies of such outputs are compared in said second unit to produce in the output thereof a voltage proportional to the difference between such compared frequencies, means for selecting one of the sideband groups resulting from the frequency modulation of said first source, and means coupling the outputs of said first and second sources to a common output circuit through said selecting means.

27. A system for transmitting amplitude modulated signals, comprising a signal input channel, a balanced amplitude modulator, a source of subcarrier current, means coupling the input of said modulator to said source and to said input channel, a first source of sideband current, a frequency modulator coupled to said first source for modulating the frequency thereof, means coupling the output of said amplitude modulator to said frequency modulator as a modulating signal for the same to thereby frequency modulate said first source, said last-named means having in series therein a wave filter which substantially eliminates one of the sidebands resulting from the amplitude modulation, a standard oscillator of substantially constant frequency, a frequency control unit having its output coupled to said frequency modulator for controlling the rest frequency of said first source, means coupling the input of said unit to the output of said first source, said last-named means having in series therein a wave filter which passes substantially only the carrier frequency of said first source, means coupling the input of said unit also to the output of said standard oscillator, whereby the frequencies of such outputs are compared in said unit to produce in the output thereof a voltage proportional to the difference between the compared frequencies, a second source of carrier current the frequency of which differs from the rest frequency of said first source by the frequency of said subcarrier source, a second frequency modulator coupled to said second source for modulating the frequency thereof, a second frequency control unit having its output coupled to said second frequency modulator for controlling the frequency of said second source, a mixer unit for mixing the outputs of said standard oscillator and of said subcarrier source, means coupling the input of said second unit to the output of said second source, said last-named means having in series therein a wave filter which passes substantially only the carrier frequency of said second source, means coupling the input of said second unit also to the output of said mixer unit, whereby the frequencies of such outputs are compared in said second unit to produce in the output thereof a voltage proportional to the difference between such compared frequencies, means for selecting one of the sideband groups resulting from the frequency modulation of said first source, and means coupling the outputs of said first and second sources to a common output circuit through said selecting means.

28. A system for transmitting amplitude modulated signals, comprising a signal input channel, an amplitude modulator, a source of subcarrier current, means coupling the input of said modulator to said source and to said input channel, a first source of radio frequency energy, a frequency modulator coupled to said first source for modulating the frequency thereof, means coupling the output of said amplitude modulator to said frequency modulator as a modulating signal for the same, a standard oscillator of substantially constant frequency, a frequency control unit having its output coupled to said frequency modulator for controlling the rest frequency of said first source, means coupling the input of said unit to the output of said first source and to the output of said standard oscillator for comparing the frequencies of such outputs in said unit to produce in the output thereof a voltage proportional to the difference between the compared frequencies, a second source of radio frequency energy the frequency of which differs from the frequency of said first source by the frequency of said subcarrier source, a second frequency modulator coupled to said second source for modulating the frequency thereof, a second frequency control unit having its output coupled to said second frequency modulator for controlling the frequency of said second source, a mixer unit for mixing the outputs of said standard oscillator and of said subcarrier source, means coupling the input of said second unit to the output of said second source and to the output of said mixer unit for comparing the frequencies of such outputs in said second unit to produce in the output thereof a voltage proportional to the difference between such compared frequencies, means coupling the outputs of said first and second sources to a comon output circuit, and a negative feedback unit having its input coupled to said common output circuit and its output coupled to said amplitude modulator.

29. In a system for transmitting amplitude modulated signals on a radio frequency carrier, one source of radio frequency carrier current, two sources of radio frequency sideband current which are 180° out of phase with each other, means for frequency modulating said sideband sources in push-pull by signals to be transmitted, and means coupling all of said sources to a common output circuit.

30. In a system for transmitting television pictures with direct current information, a source of sideband current consisting mainly of first order sidebands, two sources of carrier current which are in phase with each other, a source of subcarrier current, means for compressing or expanding said subcarrier according to the direct current information of the television picture, means for frequency modulating said carrier sources in push-pull by said subcarrier, and means coupling said sideband source and said carrier sources to a common output circuit.

31. In a system for transmitting amplitude modulated signals on a radio frequency carrier, one source of radio frequency carrier current, two sources of radio frequency sideband current which are 180° out of phase with each other, means for amplitude modulating the signals to be transmitted onto a subcarrier by means of a balanced modulator, means for frequency modulating said sideband sources in push-pull by the amplitude modulated subcarrier, and means coupling all of said sources to a common radiating means.

32. In a system for transmitting amplitude modulated signals on a radio frequency carrier, a source of carrier current, a source of subcarrier current, means for amplitude modulating said second-named source by signals to be transmitted, means for substantially suppressing one sideband resulting from said amplitude modulation, means for frequency modulating said first-named source by the amplitude modulated sideband passed by said suppressing means, and means for selecting one of the sideband groups resulting from said frequency modulation.

LESLIE L. KOROS.

REFERENCES CITED

The following references are of record in the file of this patent:

UNITED STATES PATENTS

| Number | Name | Date |
|---|---|---|
| 1,744,044 | Green | Jan. 21, 1930 |
| 2,161,320 | Schulze-Herringen | June 6, 1939 |
| 2,247,511 | Lewis | July 1, 1941 |
| 2,301,395 | Goldsmith | Nov. 10, 1942 |
| 2,305,864 | Gottier | Dec. 22, 1942 |
| 2,342,943 | Kell | Feb. 29, 1944 |
| 2,421,727 | Thompson | June 3, 1947 |
| 2,476,162 | Thompson | July 12, 1949 |
| 2,500,945 | Hansen | Mar. 1, 1950 |